(12) United States Patent
Seago et al.

(10) Patent No.: US 8,935,397 B2
(45) Date of Patent: Jan. 13, 2015

(54) DIVIDING CLOUD RESOURCES

(75) Inventors: Scott Wayne Seago, Warwick, MA (US); Jason Guiditta, Oxford, CT (US)

(73) Assignee: Red Hat, Inc., Raleigh, NC (US)

(*) Notice: Subject to any disclaimer, the term of this patent is extended or adjusted under 35 U.S.C. 154(b) by 585 days.

(21) Appl. No.: 12/828,809

(22) Filed: Jul. 1, 2010

(65) Prior Publication Data
US 2012/0005341 A1 Jan. 5, 2012

(51) Int. Cl.
*G06F 15/173* (2006.01)
*G06F 9/50* (2006.01)

(52) U.S. Cl.
CPC .................................. *G06F 9/5072* (2013.01)
USPC ............................ 709/225; 709/203; 719/328

(58) Field of Classification Search
USPC .......................... 709/203, 246, 225; 719/328
See application file for complete search history.

(56) References Cited

U.S. PATENT DOCUMENTS

| | | | |
|---|---|---|---|
| 2006/0101474 A1 | 5/2006 | Magown | |
| 2007/0150596 A1* | 6/2007 | Miller et al. | 709/226 |
| 2009/0216999 A1 | 8/2009 | Gebhart et al. | |
| 2010/0050172 A1 | 2/2010 | Ferris et al. | |
| 2010/0125669 A1* | 5/2010 | Esfahany et al. | 709/228 |
| 2010/0131649 A1 | 5/2010 | Ferris et al. | |
| 2010/0306379 A1* | 12/2010 | Ferris | 709/226 |
| 2010/0329642 A1 | 12/2010 | Kam et al. | |
| 2011/0087726 A1 | 4/2011 | Shim et al. | |
| 2011/0126197 A1 | 5/2011 | Larsen et al. | |
| 2011/0289555 A1* | 11/2011 | DeKoenigsberg et al. | 726/3 |
| 2012/0005262 A1 | 1/2012 | McWhirter | |
| 2012/0005263 A1 | 1/2012 | McWhirter | |
| 2012/0005264 A1 | 1/2012 | McWhirter | |
| 2012/0005359 A1 | 1/2012 | Seago | |
| 2012/0005584 A1 | 1/2012 | Seago | |

OTHER PUBLICATIONS

USPTO; Office Action for U.S. Appl. No. 12/828,778 mailed Mar. 29, 2012.
USPTO; Office Action for U.S. Appl. No. 12/828,787, mailed Mar. 29, 2012.
USPTO; Office Action for U.S. Appl. No. 12/828,795, mailed Mar. 15, 2012.
USPTO; Office Action for U.S. Appl. No. 12/828,817, mailed May 15, 2012.
USPTO; Office Action for U.S. Appl. No. 12/828,806, mailed Apr. 2, 2012.

* cited by examiner

*Primary Examiner* — El Hadji Sall
(74) *Attorney, Agent, or Firm* — Lowenstein Sandler LLP

(57) ABSTRACT

A method and apparatus for dividing resources provided by cloud computing systems is described. In one embodiment, the method includes receiving a specification of a subset of cloud computing systems from among a plurality of cloud computing systems. The method may also include joining the subset of cloud computing systems into a pool of cloud computing resources. Furthermore, the method may include providing access to the pool of cloud computing resources.

17 Claims, 16 Drawing Sheets

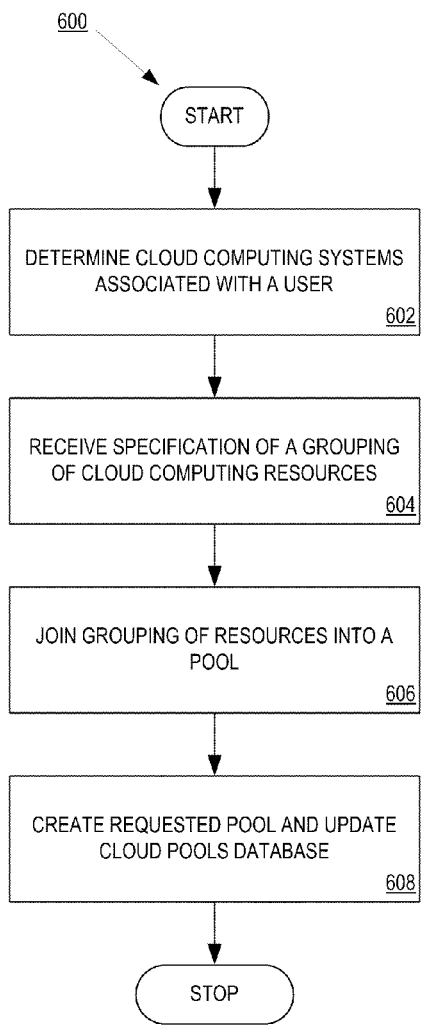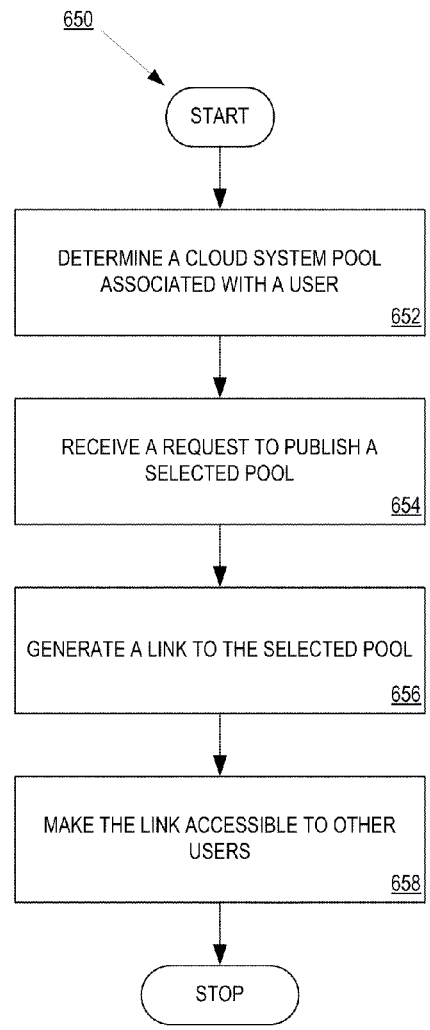
FIG. 6A
FIG. 6B

FIG. 7C

DIVIDING CLOUD RESOURCES

This application is related to the applications entitled Aggregation Across Cloud Providers concurrently filed on Jul. 1, 2010, U.S. patent application Ser. No. 12/828,806, now U.S. Pat. No. 8,725,891, issued May 13, 2014; and System and Method for Providing a Cloud Computing Graphical User Interface, concurrently filed on Jul. 1, 2010, U.S. patent application Ser. No. 12/828,817, now U.S. Pat. No. 8,639,747, issued Jan. 28, 2014.

TECHNICAL FIELD

Embodiments of the invention relate to the field of cloud computing systems, and more particularly, to dividing the resources provided by a plurality of cloud computing systems.

BACKGROUND

Cloud computing is an architecture in which customers do not own the physical infrastructure related to an application, data storage center, etc. Instead, customers avoid the various expenses associated with operating computers, maintaining a communications network, maintaining software, etc. by purchasing usage from a third-party cloud system provider. Customers consume the resources of various third-party cloud systems over a communications network as a service.

Cloud systems, however, may be implemented in various formats, involve various communications protocols, and have various other specific requirements for interacting with the cloud systems. Thus, in order to interact with multiple cloud computing systems, consumer applications need to be tailored to each specific cloud system provider's requirements. As a result, a consumer will be less likely to switch cloud system providers when to make such a switch would require the consumer to update existing applications. Furthermore, the consumer may also be required to update their applications in response to cloud computing systems updates, such as when a formatting or communications protocol change occurs on a cloud system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6A is a flow diagram of one embodiment of a method for dividing cloud system resources.

FIG. 6B is a flow diagram of one embodiment of a method for publishing a cloud system pool.

FIG. 7C illustrates one embodiment of a graphical user interface for visualizing and summarizing aggregated cloud computing systems.

DETAILED DESCRIPTION

A method and apparatus for dividing resources provided by cloud computing systems is described. In one embodiment, the method includes receiving a specification of a subset of cloud computing systems from among a plurality of cloud computing systems. The method may also include joining the subset of cloud computing systems into a pool of cloud computing resources. Furthermore, the method may include providing access to the pool of cloud computing resources.

Figure 1:
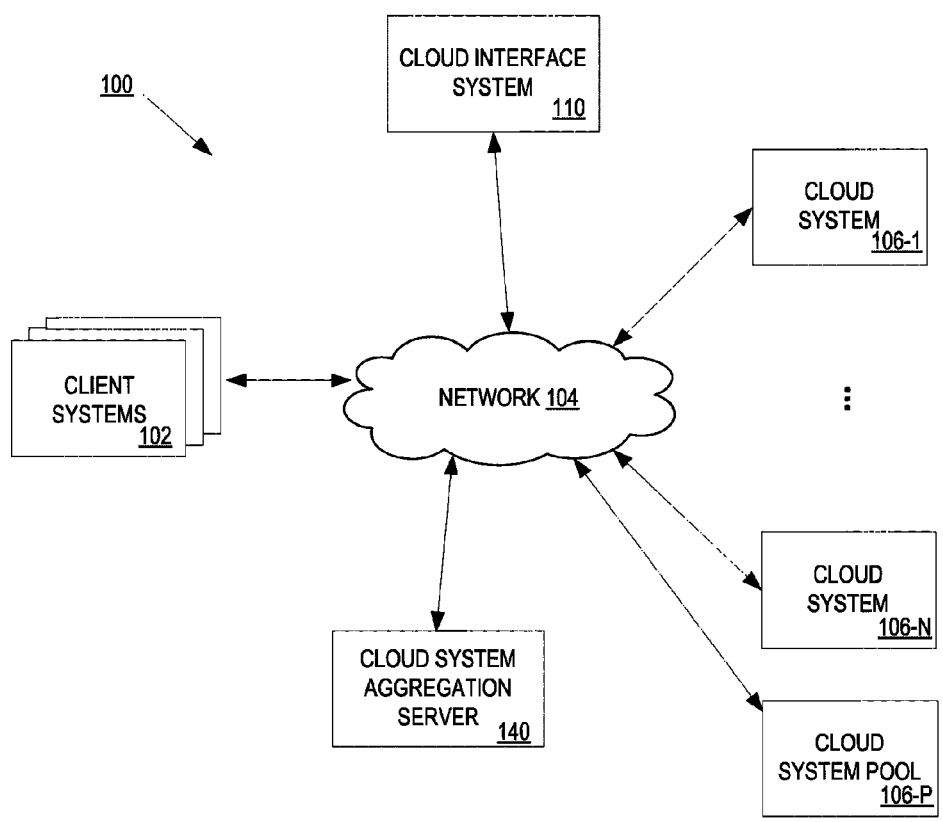
FIG. 1 is a block diagram of exemplary system architecture for a cloud computing interface system.

FIG. 1 is a block diagram of exemplary system architecture 100 for a cloud computing interface system. In one embodiment, the system architecture 100 includes client systems 102, cloud interface system 110, cloud system aggregation server 140, and cloud systems 1 through N, such as cloud systems 106. In one embodiment, the client systems 102, cloud interface system 110, cloud system aggregation server 140, and cloud systems 106 may include one or more computing devices such as server computers, desktop computers, laptop computer systems, netbooks, etc. Furthermore, the client systems 102, cloud interface system 110, cloud system aggregation server 140, and cloud systems 106 may be coupled to a computer network 104 that communicates via any of the standard protocols for the exchange of information. The computer network 104 may be a private network (e.g., a local area network (LAN< etc.) or a public network (e.g., Internet, etc.).

In one embodiment, cloud interface system 110 is responsible for providing a neutral communications interface between client systems 102 and disparate cloud systems 106. In one embodiment, cloud systems 106 are server based systems that provide cloud computing services, such as remote data storage, business applications, internet services, security services, content distribution, etc. to client systems 102. However, different cloud providers, such as cloud system 106-1 and cloud system 106-N may communicate and provide their respective services via disparate interfaces or communications protocols. For example, the cloud systems 106 can be implemented using different computing platforms, such as AMAZON EC2™, RED HAT™ RHEV-M, VMWARE™ ESX, etc.

In one embodiment, cloud interface system 110 is an intermediary for communications between client systems 102, cloud system aggregation server 140, and cloud systems 106. In one embodiment, cloud interface system 110 abstracts vendor specific requirements, such as communication protocol, data formatting, etc., to a neutral cloud interface system 110 format, as described in ARCHITECTURE, SYSTEM AND METHOD FOR PROVIDING A NEUTRAL APPLICATION PROGRAMMING INTERFACE FOR ACCESSING DIFFERENT CLOUD COMPUTING SYSTEMS, filed on Jul. 1, 2010, U.S. patent application Ser. No. 12/828,778, now U.S. Pat. No. 8,631,067. In one embodiment, cloud interface system 110 translates client system 102 or cloud system aggregation server 140 requests received in the neutral format to requests formatted for a specific target cloud system 106. In one embodiment, cloud interface system 110 further translates the responses of the cloud system 106 to the neutral format for client system 102 or the cloud system aggregation server 140. In one embodiment, for example, the requests and responses are formatted in extensible markup language (XML).

In one embodiment, cloud interface system 110 further translates the responses of the cloud system 106 to the neutral format for client system 102 or the cloud system aggregation server 140. In one embodiment, for example, the requests and responses are formatted in extensible markup language (XML).

In one embodiment, cloud-based applications executed by client systems 102 may access the services provided by disparate cloud systems 106 via a single vendor neutral communications syntax of cloud interface system 110. In one embodiment, client systems 102 are therefore insulated from vendor-specific communications protocols and messaging formats. As a result, if client system 102 switches between cloud systems 106-1 and 106-N, client system 102 needs only to direct their requests to a recipient cloud system 106-i via cloud interface system 110, without reformatting the request, issuing the request in a proprietary format, etc. In one embodiment, cloud interface system 110 translates the requests and responses thereby insulating client systems from difficulties that may arise from switching cloud system providers, updates to communications systems of cloud systems, protocol changes that apply to cloud systems, etc.

In one embodiment, client systems 102 communicate with cloud systems 106 via cloud system aggregation server 140. In one embodiment, client system 102 issues a request to cloud system aggregation server 140 for cloud system resources. In one embodiment, cloud system aggregation server 140 determines one or more cloud systems 106 with resources that can satisfy the client system's 102 request, and issues the requests to the selected cloud systems 106 via cloud interface system 110 utilizing the neutral communications syntax. Cloud system aggregation server 140 thereafter directs client system 102 requests to the selected cloud system and forwards responses of the selected cloud system 106 back to the client system 106.

In one embodiment, cloud system aggregation server 140 provides client systems 102 access to multiple disparate cloud systems from one point of contact with the cloud system aggregation server 140. Furthermore, client systems 102 are not burdened with the task of deciding which particular cloud system 106 to direct a request towards, as cloud system aggregation server 140 determines which cloud system, or cloud systems, will hand client system 102 requests. As discussed below, in one embodiment, cloud system aggregation server 140 determines how to route the client system 102 requests utilizing such factors as comparative costs of the cloud systems 106 given the client systems 102 resource needs, whether or not potential clouds are internal (e.g., cloud systems 102 on the same local network as the requesting client system 102, or belonging to the same organization as the requesting client system 102), whether there are preferred cloud systems 106, user permissions to access different cloud systems 106, availability of images across cloud systems 106, availability of matching hardware profiles (i.e., virtual machine size, architecture, operating system, etc.) provided by cloud systems 106, etc.

In one embodiment, cloud system aggregation server 140 further dynamically changes which cloud system 106-i client system 102 requests are directed to. In one embodiment, the redirection to different cloud systems 106 may be done in response to cloud system aggregation server 140 detecting resource changes at specific cloud systems 106, user preference changes, whether or not cloud systems providers are experiencing technical difficulty, cloud system resource usage limitations, etc. Thus, cloud system aggregation server 140 performs the redirection without informing the client systems 102, as communication with client systems 102 remains in the neutral communications syntax of cloud interface system 110.

In one embodiment, cloud system aggregation server 140 may publish a pool of cloud system 106 resources, such as cloud system pool 106-P. In one embodiment, cloud system aggregation server 140 makes published cloud system pool 106-P available via a URL through cloud interface system 110. In one embodiment, published cloud system pool 106-P is a virtual cloud that represents a subset of the resources of cloud systems 106-1 through 106-N. Thus, when a client system 102 issues a request to connect to cloud system pool 106-P, cloud system aggregation server 140 determines what cloud system 106 within the pool 106-P to direct client system 102 requests. In one embodiment, the determination of what cloud system 106 within the pool 106-P client requests are directed towards is performed as discussed above, with the exception that only cloud systems 106 within the pool 106-P are considered.

For example, an information technology (IT) department in a major corporation may have access to multiple cloud systems. However, the IT department may partition out resources to other departments, such as the accounting department, within the corporation. Thus, the IT department could select three specific cloud systems from all available cloud systems and publish the selected cloud system resources as a pool. Then, any client system 102 in the accounting department could access the three different cloud systems, as chosen by the cloud system aggregation server 140, by issuing a request to access the pool.

In one embodiment, cloud system pool 106-P may include other cloud system pools (not shown) as a resource within cloud system pool 106-P. That is, cloud system pools may be specified recursively so that a collection of cloud system resources within a pool can be further subdivided, published, and made available to client systems 102.

Figure 2:
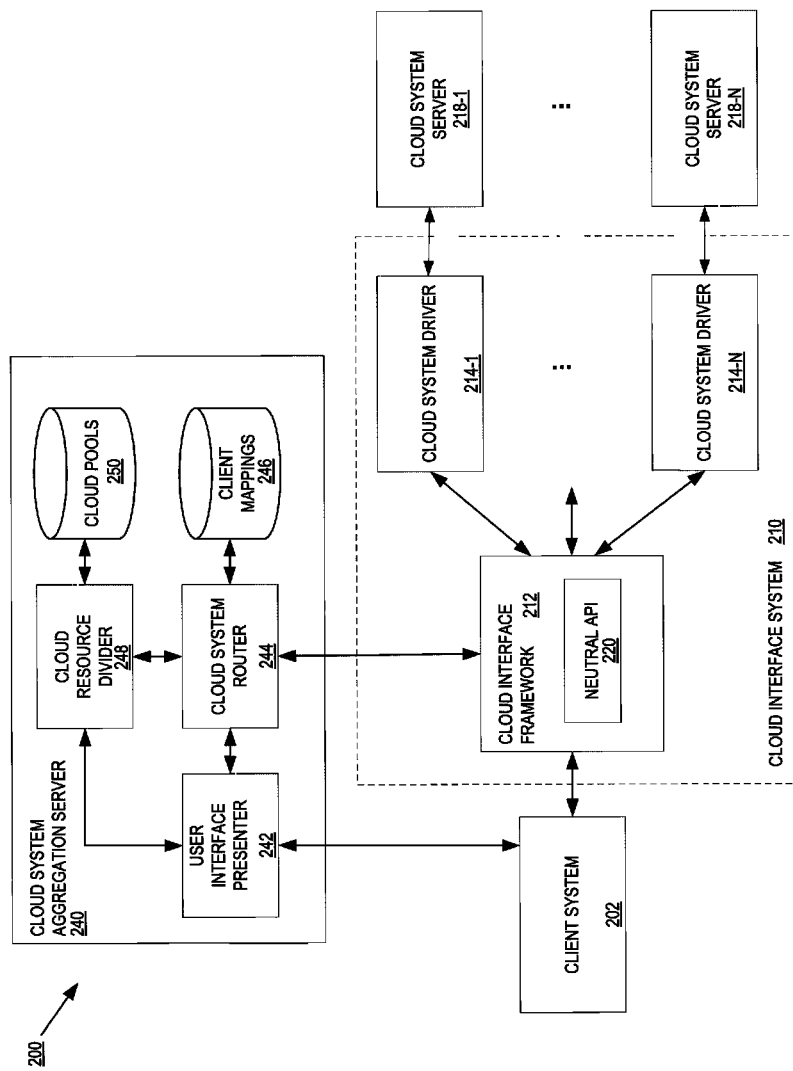
FIG. 2 is a block diagram of one embodiment of a cloud computing interface system.

FIG. 2 is a block diagram of one embodiment of a cloud computing interface system 200. In one embodiment, cloud computing interface system 200 provides additional details to the architecture discussed above with respect to FIG. 1.

In one embodiment, cloud interface system 210 is one or more server computer systems communicably coupled with client system 202, cloud system aggregation server 240, and one or more cloud systems 218. In one embodiment, cloud interface system 210 is an intermediary between client system 202 and cloud system aggregation server 240, and cloud systems 218, and provides translation services to client systems 202. In one embodiment, cloud interface system 210 provides the translation services via cloud system specific drivers, such as cloud system drivers 214. Thus, in one embodiment, client system 202 issues requests to and receives responses from cloud interface system 210 in a neutral format, via the cloud system aggregation server 240, as discussed herein. Cloud interface system 210 translates the requests to and responses from the vendor-specific or proprietary cloud systems 218. Therefore, in one embodiment, client systems 202 and cloud system aggregation server 240 are insulated from the specific details associated with each cloud system 218 provider.

In one embodiment, client system 202 issues requests to connect to cloud system servers 218 via hypertext transfer protocol (HTTP) links provided by cloud system aggregation server 240. In one embodiment, client system 202 utilizes a representational state transfer (REST) communications protocol for communicating cloud system requests. In one embodiment, the REST communications protocol is a communications protocol where client system 202 initiates requests in a neutral syntax via a user interface 220 of cloud system aggregation server 240, a router 220 of cloud system aggregation server 240 determines and routes the client system 202 request to a selected cloud system server 218-*i*, and cloud interface system 210 processes the requests in order to return appropriate responses in the neutral syntax from the selected cloud system server 218-*i*. In one embodiment, cloud interface system 210 translates the client system requests to a cloud system-specific request and then receives a cloud system-specific response. The cloud system-specific response is then translated into the neutral syntax and returned to the client system 202 via the cloud system aggregation server 240. In one embodiment, the neutral communications syntax is extensible markup language (XML) formatted communications.

In one embodiment, communication with cloud interface framework 212 is performed via a neutral applications programming interface 220. In one embodiment, the neutral applications programming interface 220 implemented by cloud interface framework 212 that defines the interface between client system 202 or cloud system aggregation server 240, and cloud interface system 210. In one embodiment, the neutral applications programming interface 220 of cloud interface framework 212 defines images and instances. In one embodiment, an image is a prototype of a server computer system, which defines attributes of the server computer system, and acts as a template for creating instances on a server computer system. In one embodiment, an instance is a concrete server computer system that is realized from the image.

In one embodiment, neutral applications programming interface 220 of cloud interface framework 212 further provides actions or methods that may be performed, via the instances, on cloud system 218 servers. For example, the actions may include start, stop, reboot, etc. that correspond to actions to be performed on a cloud system 218.

In one embodiment, the neutral applications programming interface 220 of cloud interface framework 212 provides an abstraction of the vendor specific implementations of cloud systems 218. In one embodiment, a cloud system driver 214 is associated with a respective cloud system 218 and is aware of the message format supported by the respective cloud system 218 and other features and/or properties pertaining to the respective cloud system 218. A cloud system driver 214 may be responsible for translating and filtering communication between client system 202 and a corresponding cloud system 218. In one embodiment, cloud system drivers 214 translate the terms and actions, such as image, instance, start, reboot, etc., to cloud-specific terms and actions. For example, client system requests may be routed by cloud system aggregation server 240 to an image for a cloud system 218 via the neutral applications programming interface 220 of cloud interface framework 212. In one embodiment, a driver would translate the neutral formatted application programming interface image to the corresponding element supported by a cloud system 218, such as a template in RED HAT™ RHEV-M or a vendor specific image in AMAZON EC2™. In one embodiment, new cloud system drivers 214 are dynamically added to cloud interface system 210 as new cloud systems 218 become available for use by clients 102, In one embodiment, cloud system drivers 214 enable bi-directional communication between the services offered by cloud system 218 and client system 202 or cloud system aggregation server 240, without the need for client system 202 or cloud system aggregation server 240 to change the programing of a client application or the formatting for communicating messages based on cloud system 218 requirements. Rather, cloud system drivers 214 provide the vendor-specific interface to cloud systems 218, while client system 202 and cloud system aggregation server 240 communicate with cloud system drivers 214 via the neutral communication syntax, such as a standardized XML communications format, of the neutral applications programming interface 220 of the cloud interface framework 212.

In one embodiment, client system 202 issues requests and receives response from multiple cloud systems 218 via a single connection with cloud system aggregation server 240. In one embodiment, client system 202 access cloud system aggregation server 240 via user interface presenter 242 of cloud system aggregation server 240. In one embodiment, user interface presenter 242 provides the front end that client systems 202 utilize to access cloud system 218 resources. In one embodiment, user interface presenter 242 generates graphical user interfaces, such as is illustrated in FIGS. 7A-7H, that enable a user of client system 202 to issue requests for cloud system resources, analyze and monitor current connections, determine cloud system usage statistics, etc.

In one embodiment, in response to cloud system aggregation server 240 receiving a client system 202 request for cloud system 218 resources, cloud system router 244 determines which cloud system 218-*i* will be provided the request. In one embodiment, cloud system router determines how to route the client system 202 request by analyzing a client mappings 246 database. In one embodiment, the client mappings 246 database stores data about each of the cloud systems 218, such as services provided, quality of service, prices for services, available storage space, processor, etc., as well as data about users of the client system 202, such as user permissions to access specific cloud systems, budgets, etc. In one embodiment, client mappings 246 database maps the user data to cloud providers to enable cloud system router 244 to determine how to route user requests. For example, cloud system router 244 may receive a user request to access a cloud system that offers computing services with a specific processing requirements. In response to receiving the request, cloud system router 244 would consult the client mappings 246 database to determine which cloud systems 218, mapped to the requesting client system 202, satisfy the requirements of the request 246. In one embodiment, cloud system router 244 may then determine one of the cloud systems 218 to direct the user's request, by analyzing factors such as cost, quality of service, locality, server loads, etc. Furthermore, in one embodiment, cloud system router 244 may change the cloud system that is handling a client systems request in response to detecting changes in the cloud systems.

In one embodiment, cloud resource divider 248 of cloud system aggregation server 240 receives requests from client system 202 to publish cloud system pools 250. In one embodiment, cloud resource divider 248 receives a specification of cloud system 218 resources that client system 202 has permission to access. Cloud resource divider 248 stores the collection of specified cloud systems 218 in cloud pools 250 database, and offers the pool as a cloud system via the user interface presenter 242. In one embodiment, by publishing the pool of cloud systems, other client systems (not shown) are able to connect to the cloud systems in the pool simply by selecting the pool when making a cloud system request. In one embodiment, cloud system router 244 would determine which cloud system within a pool a client request should be routed to by consulting the client mappings 246 database.

Figure 3:
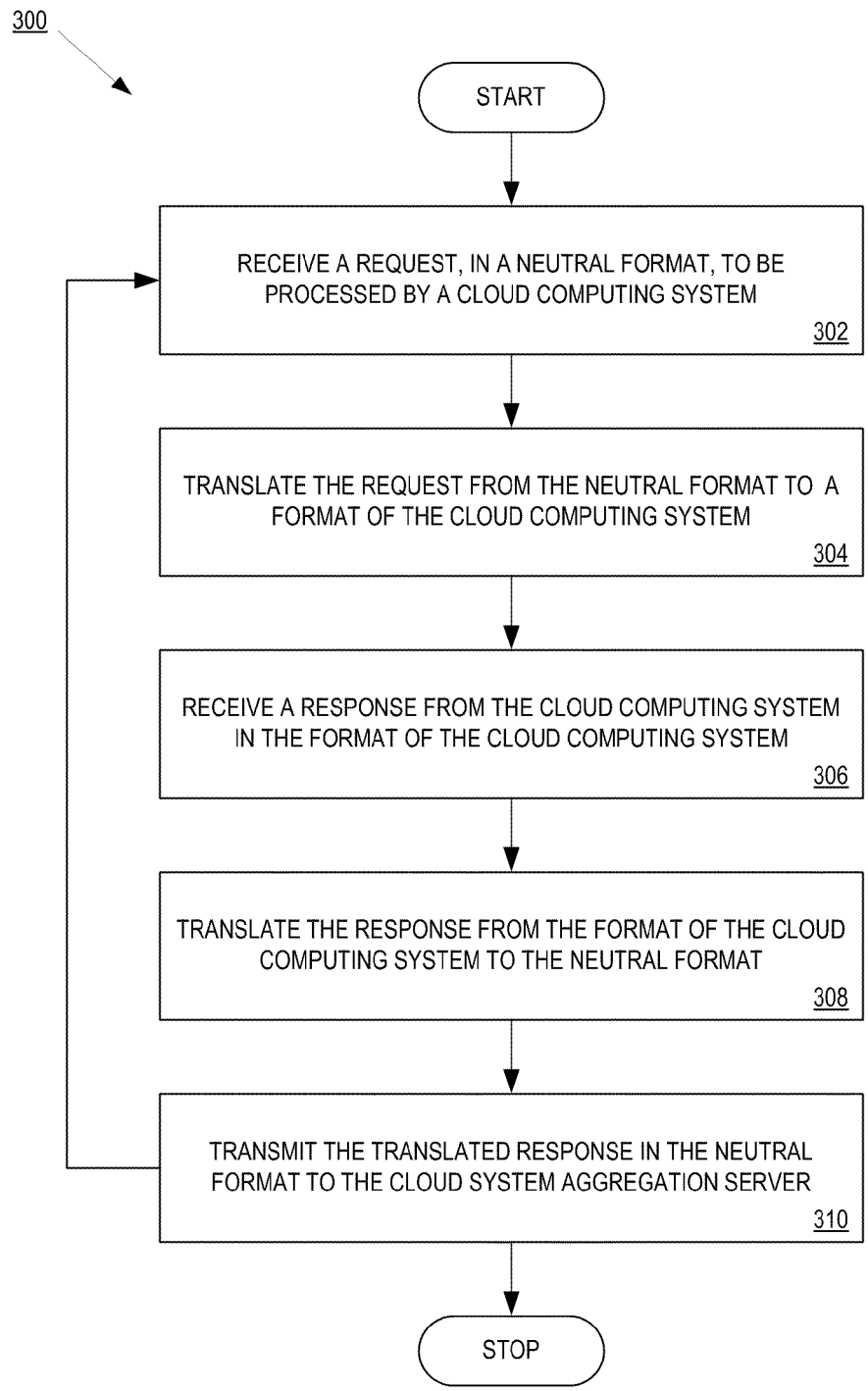
FIG. 3 is a flow diagram of one embodiment of a method 300 for providing a cloud system interface as an intermediary for communication between a cloud system aggregation server and a cloud computing system.

FIG. 3 is a flow diagram of one embodiment of a method 300 for providing a cloud system interface as an intermediary for communication between a cloud system aggregation server and a cloud computing system. The method 300 is performed by processing logic that may comprise hardware (circuitry, dedicated logic, etc.), software (such as is run on a general purpose computer system or a dedicated machine), firmware, or a combination. In one embodiment, the method 300 is performed by cloud interface system 210 of FIG. 2.

Referring to FIG. 3, the process begins by receiving a request, in a neutral format, to be processed by a cloud computing system (processing block 302). In one embodiment, the request may be received from a cloud system aggregation server. In one embodiment, the request is a request for a service provided by a cloud computing system. Such requests depend on the services offered by the cloud computing systems subject to the request. For example, the request may be a storage request, security operation request, electronic business system request, etc. In one embodiment, the request is an HTTP request received by processing logic utilizing a REST communications protocol.

In one embodiment, a standard message formatting protocol may be utilized, such as extensible markup language (XML). Other protocols for formatting messages, such as hypertext markup language (HTML), standard generalized markup language (SGML), etc. may also be utilized by processing logic. In another embodiment, processing logic may utilize a proprietary message formatting and communication scheme for receiving cloud computing system requests in the neutral format.

Processing logic translates the request from the neutral format to a format of the cloud computing system (processing block 304). In one embodiment, the cloud computing system my be one of a number of different cloud computing system platforms which provide different interfaces, communicate using different message formatting, support different protocols, etc. For example, the cloud computing system may be one of AMAZON EC2™, RED HAT™ RHEV-M, VMWARE™ ESX, or any other cloud computing system. The format of the cloud computing system may be, for example, IBM DB2 database formatted requests, an application supported by the JBOSS Enterprise Application or Ruby on Rails development environments, etc.

Processing logic then receives a response from the cloud computing system in the format of the cloud computing system (processing block 306). The response is then translated from the format of the cloud computing system to the neutral format (processing block 308). In one embodiment, as discussed above, cloud computing system-specific drivers act as a translation service for mediating messages with different cloud computing system.

Processing logic then transmits the response in the neutral format to the cloud system aggregation server 240 (processing block 310). In one embodiment, the response is also transmitted via the HTTP connection utilizing the REST protocol.

Figure 4:
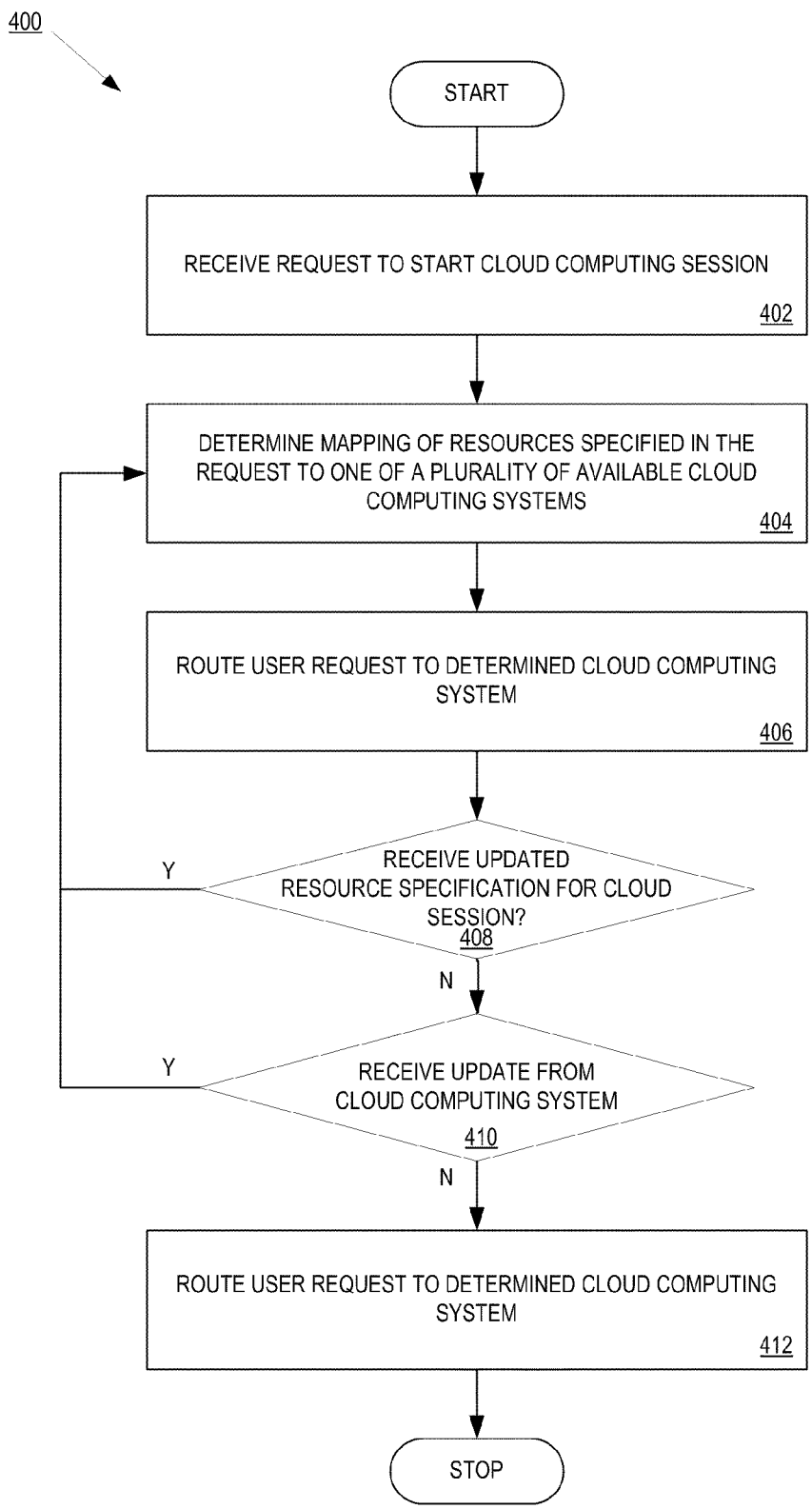
FIG. 4 is a flow diagram of one embodiment of a method for routing client system requests between different cloud systems.

FIG. 4 is a flow diagram of one embodiment of a method 400 for routing client system requests between different cloud systems. The method 400 is performed by processing logic that may comprise hardware (circuitry, dedicated logic, etc.), software (such as is run on a general purpose computer system or a dedicated machine), firmware, or a combination. In one embodiment, the method 400 is performed by cloud system router 244 of FIG. 2.

Referring to FIG. 4, the process begins by receiving a request to start a cloud computing session (processing block 402). In one embodiment, the request specifies particular resources as part of the request. For example, the request may specify a required cloud computing platform (e.g., AMAZON EC2™ RED HAT™ RHEV-M, VMWARE™ ESX, etc.), minimum memory requirement, processing speed, price cap, service guarantee, network locality, cloud system provider, etc. However, the request need not specify a specific cloud system as processing logic will decide how to route the request. The request may be received from a client system, such as client system 202 of FIG. 2.

Processing logic determines a mapping of resources specified in the request to one of a plurality of available cloud computing systems (processing block 404). In one embodiment, processing logic consults a client mappings database that includes mappings of users and clients to different cloud computing systems, the available resources of the cloud computing systems, and user permissions associated with the cloud computing systems. In one embodiment, cloud system pools may be included as cloud systems in the client mappings database. In one embodiment, processing logic matches the requirements specified in the request with the cloud systems mapped to a user by consulting database tables in the client mappings database, and selects an appropriate cloud computing system. In one embodiment, the cloud computing selection is further based on factors such as cost, user preference, quality of service, etc. in order to maximize the quality of the selected cloud computing system.

The request is then routed to the determined cloud computing system (processing block 406). In one embodiment, processing logic forwards the request to the cloud computing system to initiate a connection, or start a session, between a client system and a cloud computing system.

Processing logic determines whether updated resources specification for the cloud computing session have been received (processing block 408) or whether there are updates to any cloud computing systems (processing block 410). When there are updates, processing logic returns to processing block 404 to determine a mapping between the resources specified in the request and available cloud computing systems, based on either the updated requirements or changes to the cloud computing systems. In one embodiment, the client requirements may change during a cloud computing session, such as a client requesting increased processing resources, greater memory requirements, etc. Furthermore, a cloud computing system may change during a session, such as experiencing a reduction in quality of service, experiencing an increase in load, etc.

For example, a user may decide that she needs a faster processor, and a cloud computing system may be experiencing a particularly high load. In one embodiment, processing logic monitors for these types of changes that impact the selection of a particular cloud computing system by periodically sending status queries to cloud computing systems or receiving updated request parameters from client systems. In one embodiment, when a change does occur, processing logic dynamically changes the cloud computing system that client requests and commands are routed to, without receiving additional commands or requests from a client system.

If there are no updates, processing logic continues to route user requests to the determined cloud computing system (processing block 412). In one embodiment, processing logic continues to route user requests to the selected cloud computing system until the cloud computing session is terminated.

Figure 5:
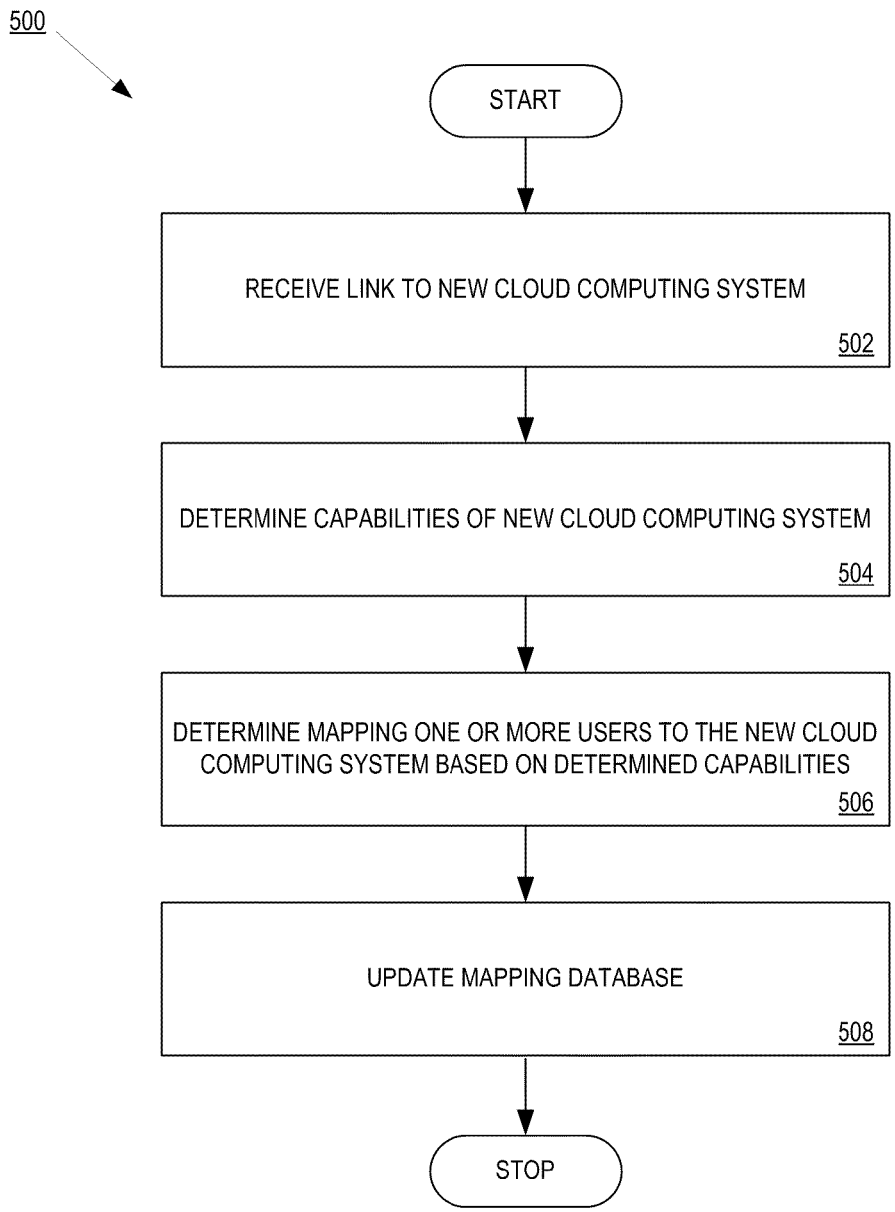
FIG. 5 is a flow diagram of one embodiment of a method for maintaining user mappings to cloud computing systems.

FIG. 5 is a flow diagram of one embodiment of a method 500 for maintaining user mappings to cloud computing systems. The method 500 is performed by processing logic that may comprise hardware (circuitry, dedicated logic, etc.), software (such as is run on a general purpose computer system or a dedicated machine), firmware, or a combination. In one embodiment, the method 500 is performed by cloud system router 244 of FIG. 2.

Referring to FIG. 5, the process begins by receiving a link to a new cloud computing system (processing block 502). In one embodiment, the link may be a URL that specifies a network location where a cloud computing system may be accessed. In one embodiment, the link further serves as the location where client systems may subsequently access the cloud computing system. In one embodiment, the link may be received from a system administrator that is adding the new cloud computing system to an existing group of available cloud computing systems, In another embodiment, the link may be received from a cloud computing system that is to be added to an existing group of available cloud computing systems.

Processing logic determines the capabilities of the new cloud computing system (processing block 504). In one embodiment, the capabilities are determined by data included with the link. The data may include, for example, storage space, memory size, types of instances supported, development environments supported, etc. In another embodiment, the capabilities of the cloud computing system are determined by accessing the link to obtain data from the cloud computing system. The data may be obtained by, for example, querying the cloud computing system or obtaining a data file from the cloud computing system that list the capabilities.

A mapping from one or more users to the new cloud computing system is determined based on the determined capabilities (processing block 506). Based on the determined capabilities of the new cloud computing system, processing logic maps users that specify the determined qualities to the cloud computing system, and users that have permissions to access the cloud computing systems. Processing logic updates the mapping database (processing block 508). In one embodiment, a client mappings database is updated with the newly created mappings for the new cloud computing system.

FIG. 6A is a flow diagram of one embodiment of a method 600 for dividing cloud system resources. The method 600 is performed by processing logic that may comprise hardware (circuitry, dedicated logic, etc.), software (such as is run on a general purpose computer system or a dedicated machine), firmware, or a combination. In one embodiment, the method 600 is performed by cloud resource divider 248 of FIG. 2.

Referring to FIG. 6A, the process begins by determining available cloud computing systems associated with a user (processing block 602). This determination can be made in response to .a client system request to a cloud resource divider to partition or divide cloud system resources associated with the user. As discussed above, cloud computing systems are mapped to users based on resources provided by the cloud computing systems and user permissions to access the cloud computing systems. For example, a user may specify resources and preferences that match one hundred available cloud computing systems. However, the user may only have permission to access ten of the cloud computing systems. Thus, in the example, there would be ten available cloud computing system associated with the user.

Processing logic receives a specification of a grouping of the determined cloud computing resources (processing block 604), and joins the grouping of resources into a pool (processing block 606) In one embodiment, the grouping of cloud computing resources may be a specification of a subset of cloud computing systems accessible to a user or client system. Continuing the example above, the user may specify a group of five cloud computing systems from the ten systems accessible to the user. In one embodiment, the five cloud computing systems are joined so that users who seek to connect to the pool for a cloud computing session, are restricted to being routed among the five cloud computing systems. Processing logic then creates the requested pool and updates a cloud pools database (processing block 608).

In one embodiment, pools of cloud computing resources may be further partitioned up into smaller pools as discussed above. In one embodiment, the creation of a new pool may also include other pools as distinct resources within the new pool. Thus, pools may be created and linked recursively to further subdivide cloud system collections and the resources provided by those collections.

FIG. 6B is a flow diagram of one embodiment of a method 650 for publishing a cloud system pool. The method 650 is performed by processing logic that may comprise hardware (circuitry, dedicated logic, etc.), software (such as is run on a general purpose computer system or a dedicated machine), firmware, or a combination. In one embodiment, the method 650 is performed by cloud resource divider 248 of FIG. 2.

Referring to FIG. 6B, the process begins by determining a cloud system pool associated with a user (processing block 652). The determination can be made in response to a client system request to a cloud system aggregation server. In one embodiment, the cloud system pool is created as discussed above with respect to FIG. 6A.

Processing logic receives a request to publish a selected pool associated with the user (processing block 654). In one embodiment, publishing a pool enables other users or client computing systems to access a subset of cloud computing resources. In one embodiment, a link to the pool is then generated (processing logic 656). In one embodiment, the link is a universal resource locator (URL) that may be accessed by other client systems over a network, and points to the pool in cloud pools 250 database maintained at cloud system aggregation server 240.

Processing logic then makes the link accessible to additional users (processing block 658). In one embodiment, the link is made accessible by including the link to the pool along with links to other cloud computing resources in a user interface of user interface presenter 242, such as individual cloud computing systems or cloud computing pools.

Figure 6C:
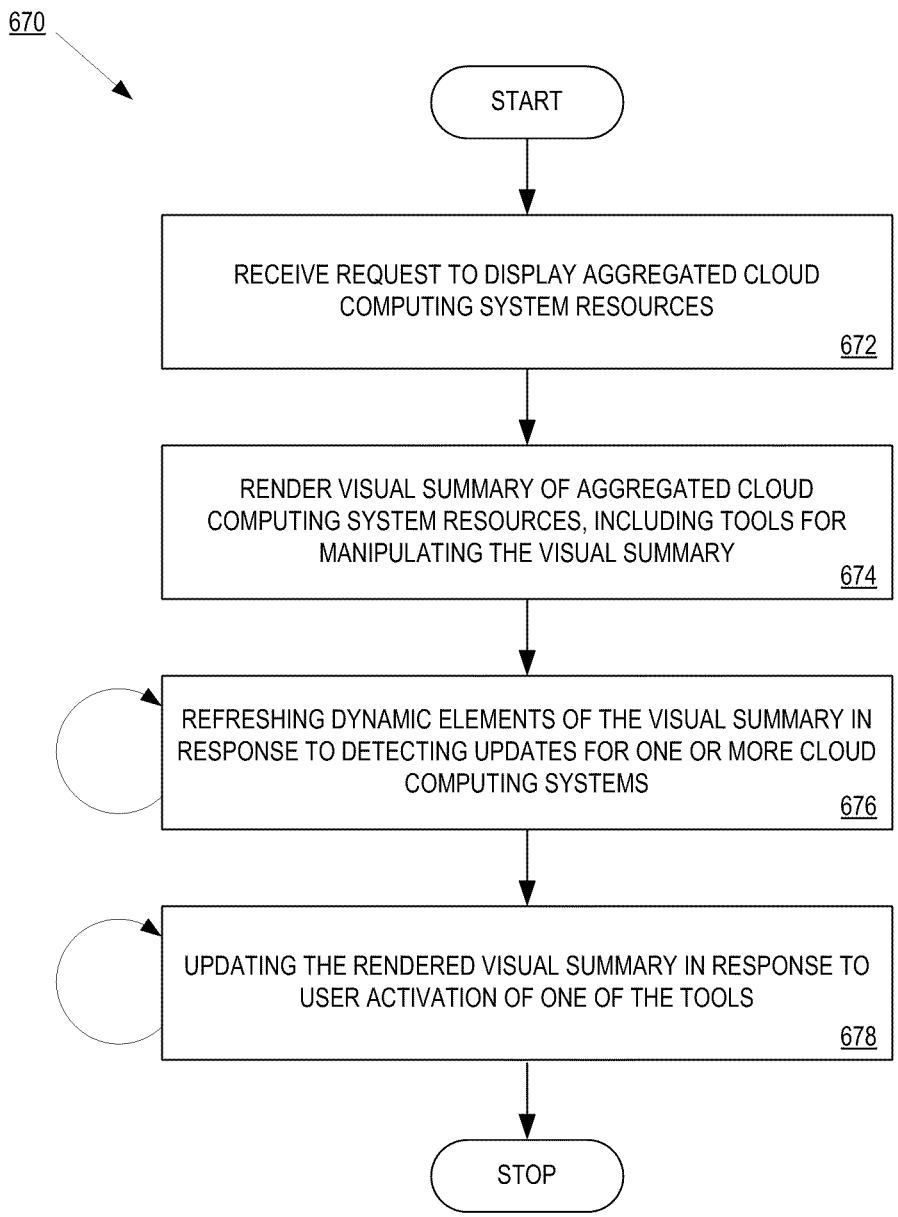
FIG. 6C is a flow diagram of one embodiment of a method for rendering a graphical user interface for aggregated cloud computing systems.

FIG. 6C is a flow diagram of one embodiment of a method 670 for rendering a graphical user interface for aggregated cloud computing systems. The method 670 is performed by processing logic that may comprise hardware (circuitry, dedicated logic, etc.), software (such as is run on a general purpose computer system or a dedicated machine), firmware, or a combination. In one embodiment, the method 670 is performed by user interface presenter 242 of FIG. 2.

Referring to FIG. 6C, the process begins by receiving a request to display aggregated cloud computing system resources (processing block 672). In one embodiment, the request is received from a client system at a cloud system aggregation server.

Figure 7A:
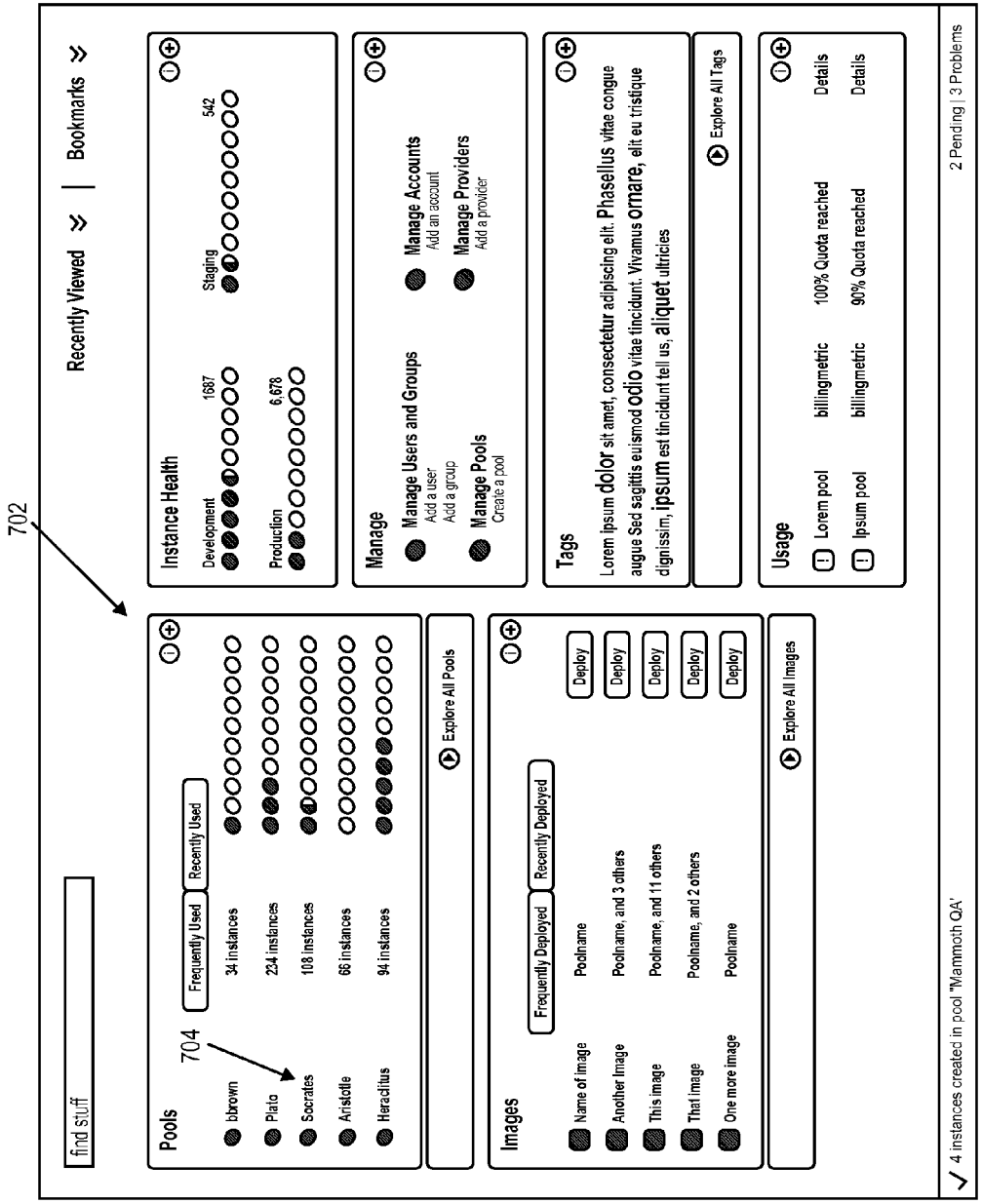
FIG. 7A illustrates one embodiment of a graphical user interface for visualizing and summarizing aggregated cloud computing systems.

Processing logic renders a visual summary of aggregated cloud computing system resources, including tools for manipulating the visual summary (processing block 674). In one embodiment, the visual summary may include one or more cloud computing system pools. In one embodiment, the visual summary may include one or more portlets, as illustrated in FIG. 7A, where each portlet displays data that summarizes a different cloud computing system resource.

Dynamic elements of the visual summary are refreshed by processing logic in response to detection of updates for one or more cloud computing systems (processing block 676). In one embodiment, processing logic may query cloud computing systems for resource updates. In another embodiment, processing logic may receive notifications from cloud computing systems regarding the status of resources at different cloud computing systems. In one embodiment, processing logic refreshes dynamic icons displayed in the visual summary, as discussed below and illustrated in FIGS. 7F-7H. In one embodiment, the dynamic icons in the visual summary display current data associated with cloud computing systems to provide a miniature overview of statistics associated with cloud computing system resources.

Figure 7B:
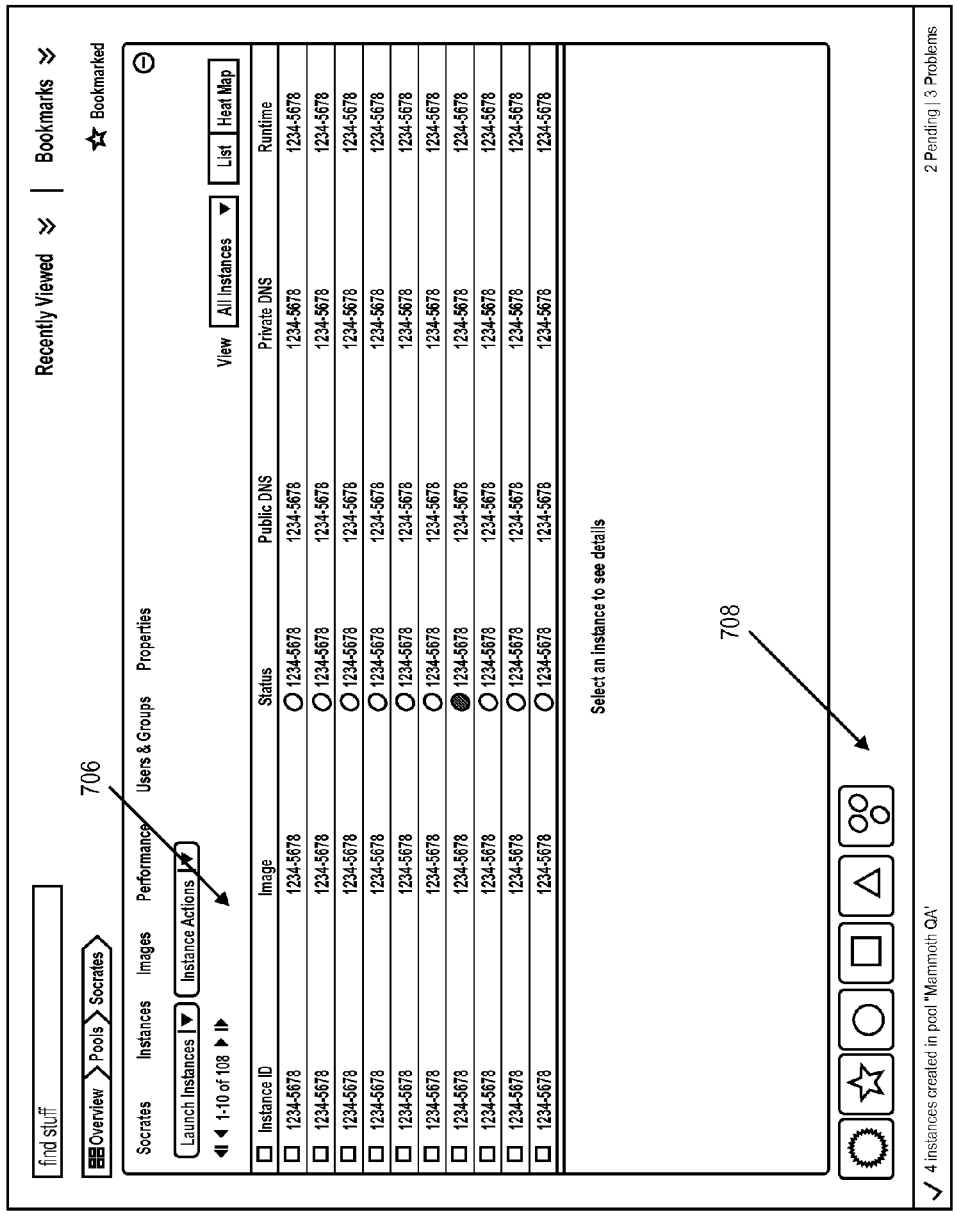
FIG. 7B illustrates one embodiment of a graphical user interface for visualizing and summarizing aggregated cloud computing systems.

Processing logic updates the rendered visual summary in response to user activation of one of the tools for manipulating the visual summary (processing block 678). In one embodiment, one of the tools may be include selectable portlets, as illustrated in FIG. 7A. In response to user activation of a portlet, processing logic may update the visual summary by displaying more specific data associated with a selected portlet while iconicising non-selected portlets, as illustrated in FIG. 7B.

Figure 7C:
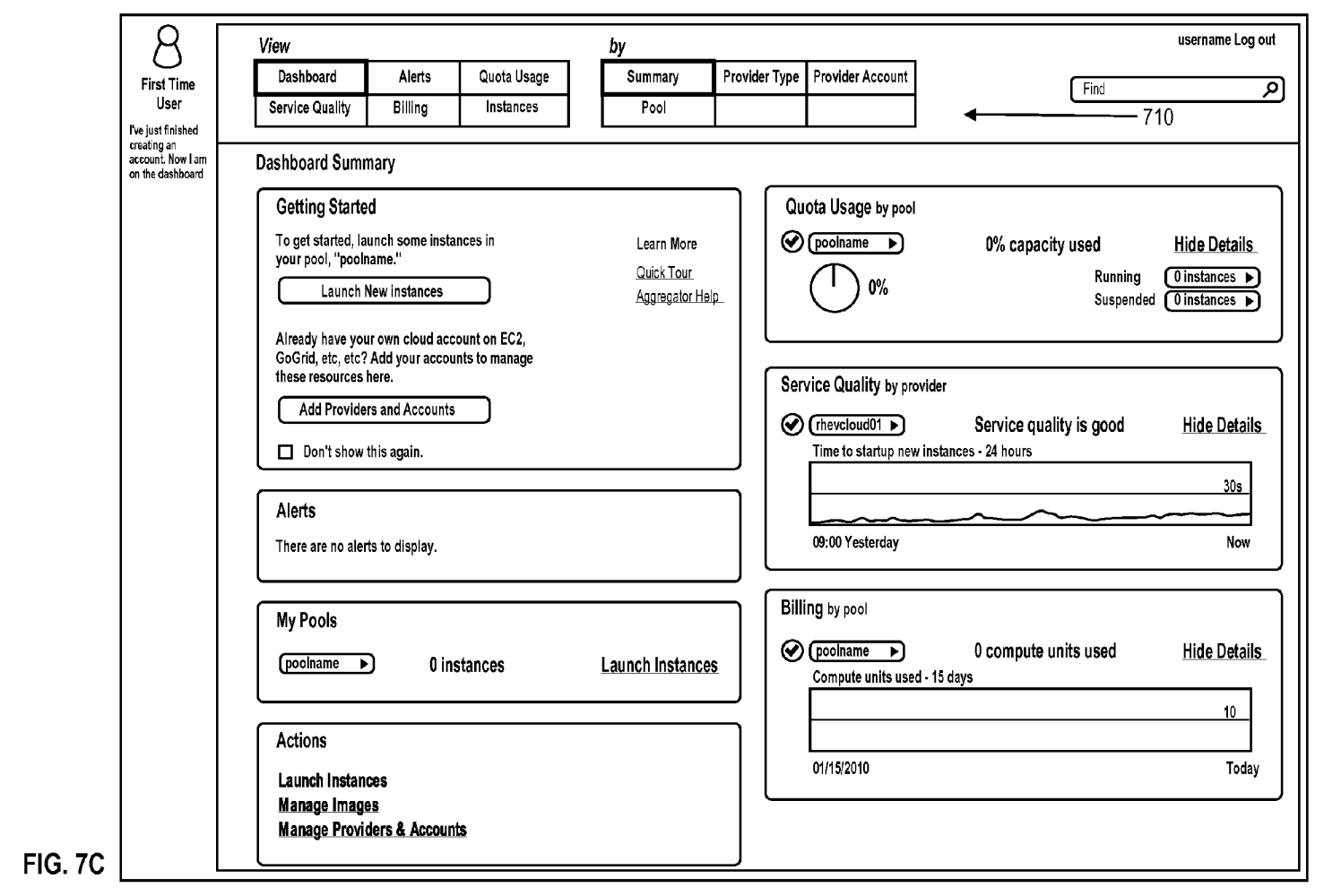
Figure 7D:
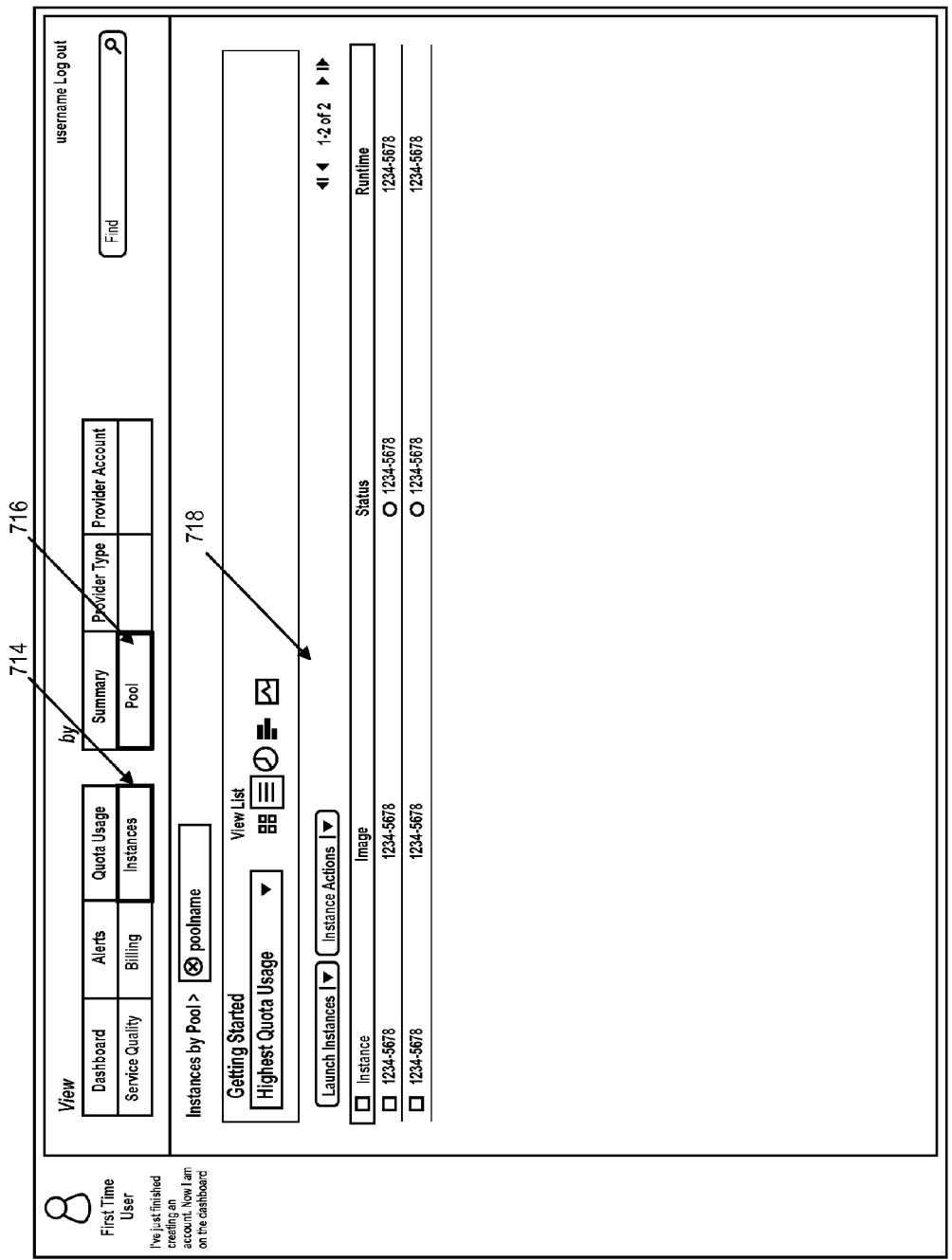
FIG. 7D illustrates one embodiment of a graphical user interface for visualizing and summarizing aggregated cloud computing systems.
Figure 7E:
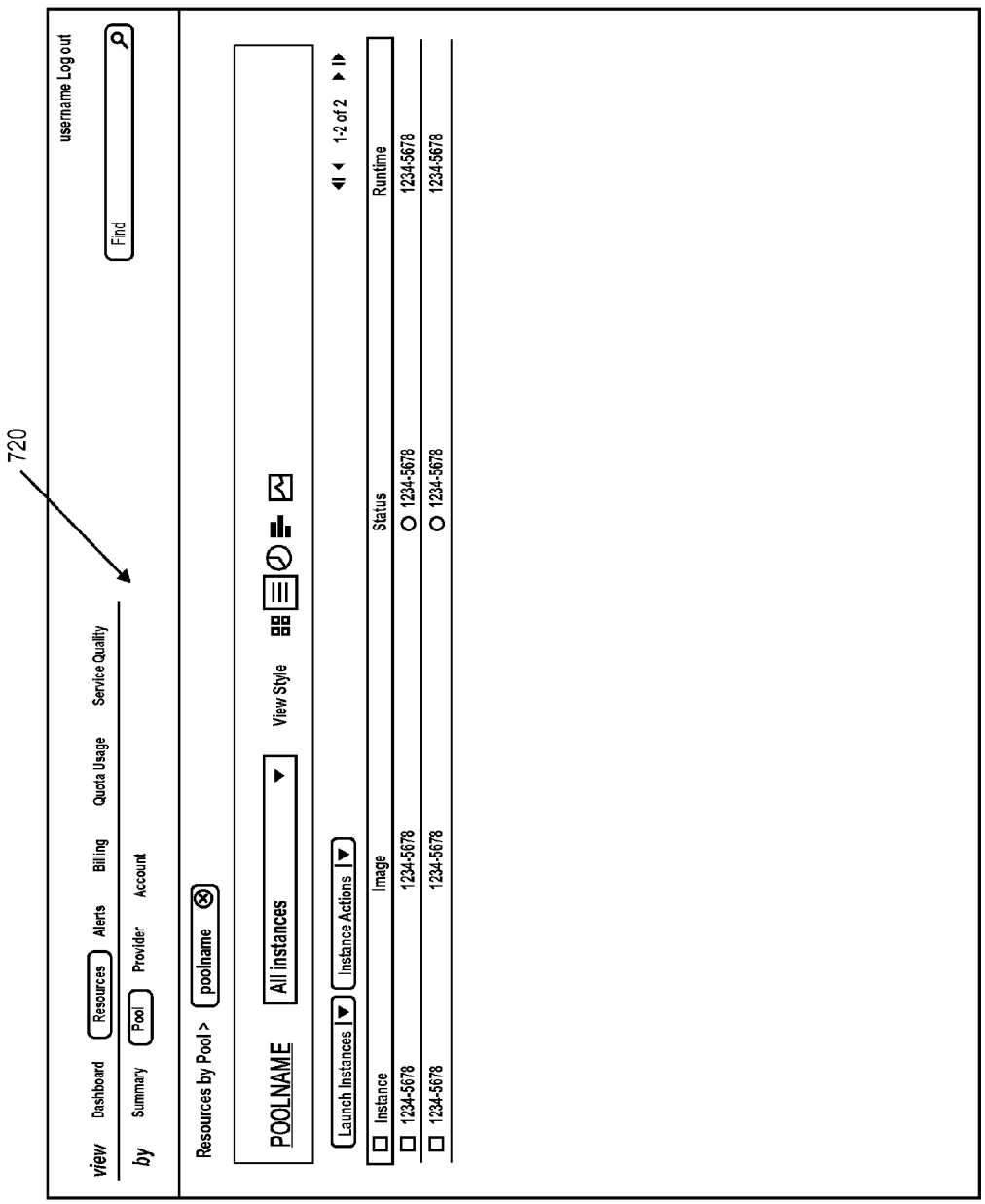
FIG. 7E illustrates one embodiment of a graphical user interface for visualizing and summarizing aggregated cloud computing systems.

In one embodiment, another tool for manipulating the visual summary may be a pivot navigator for selecting how specific cloud computing system resources are rendered in the visual summary, as illustrated in FIGS. 7C-7F. In one embodiment, the pivot navigator may include multiple selectable areas, as illustrated in FIGS. 7D and 7E, such that data within the intersection of selected pivot points are rendered by processing logic. In one embodiment, one of the pivot points may include different cloud computing system resources to be displayed, such as alerts, usage quotas, service quality, etc. In one embodiment, another pivot point may include different types of visual summaries, such as a summary, provider type, pool, etc. In one embodiment, processing logic utilizes the two pivot points to render updated visual summaries as selected by a user. For example, FIG. 7D illustrates a visual summary that displays a summary of instances by pools that include the instances.

FIGS. 7A-7H illustrate graphical user interfaces for visualizing and summarizing aggregated cloud computing system resources. In one embodiment, the graphical user interfaces are generated by the user interface presenter 242 of FIG. 2, and as discussed above in FIG. 6C.

FIG. 7A illustrates one embodiment of a graphical user interface 702 for displaying aggregated cloud computing resources, including a plurality of portlets. In one one embodiment, the graphical user interface is generated by user interface presenter 242. In one embodiment, each portlet summarizes a different aspect of a plurality of cloud computing systems. For example, the portlets could summarize cloud pools, such as those created by cloud resource divider 248 of FIG. 2, images of the pools, health of the pools, usage, etc.

In one embodiment, in response to user selection of data displayed within portlet 704, more specific information for the selection is displayed by interface presenter 242. In one embodiment, FIG. 7B illustrates the detailed view 706 of selected cloud system pool selected in FIG. 7A. Furthermore, in one embodiment, when a detailed view of a selected pool is displayed, non-selected cloud computing data is collapsed and iconicized 708 by user interface presenter 242. In one embodiment, in response to selection of one of the icons 708, interface presenter 242 updates the display 706 to provide detailed data associated with the newly selected icon (i.e., cloud computing system facets such as instance health, images, other pools, etc.).

Figure 7F:
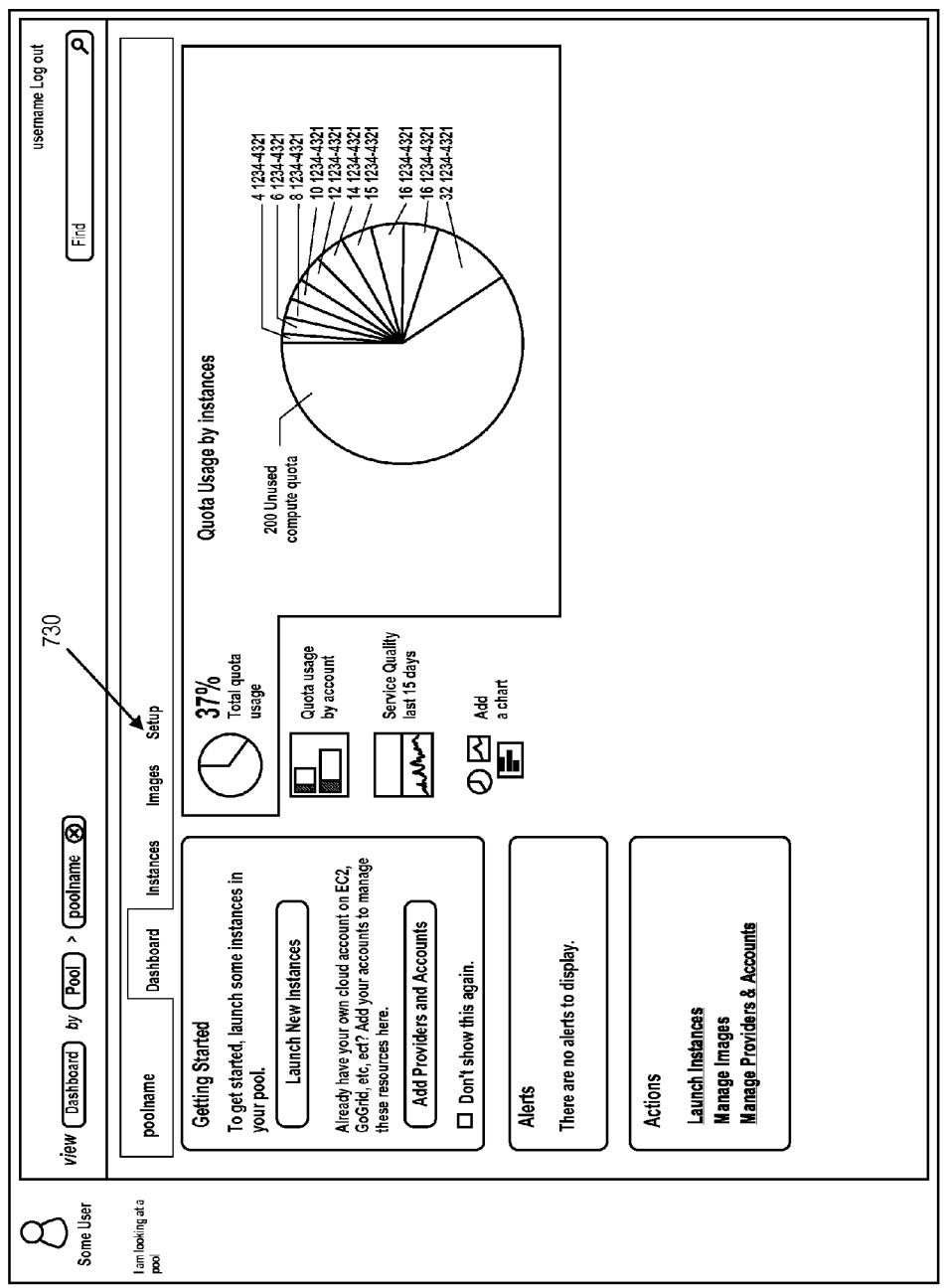
FIG. 7F illustrates one embodiment of a graphical user interface for visualizing and summarizing aggregated cloud computing systems.
Figure 7G:
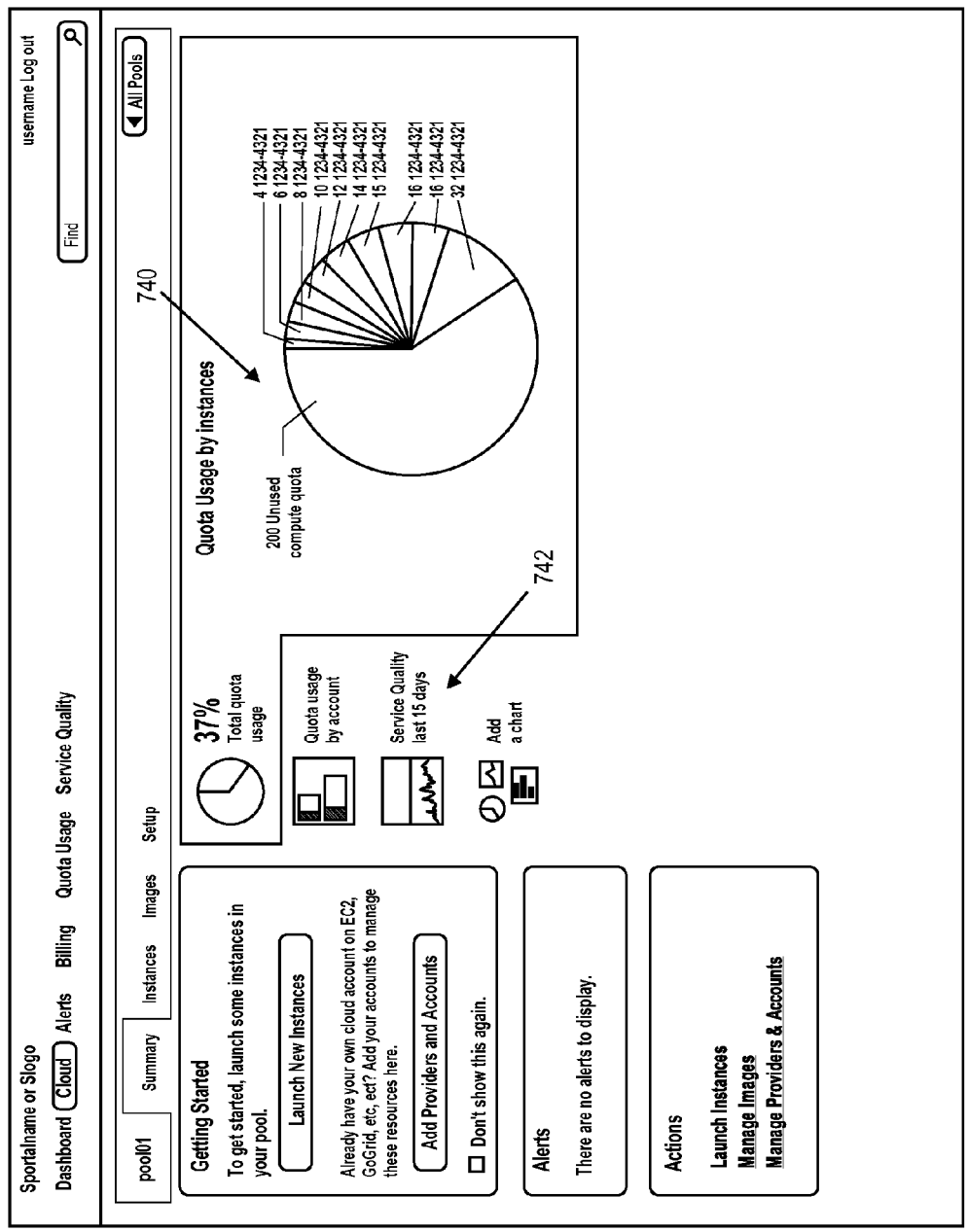
FIG. 7G illustrates one embodiment of a graphical user interface for visualizing and summarizing aggregated cloud computing systems.

In another embodiment, cloud computing system statistics are displayed by user interface presenter 242 according to a pivot navigator 710 as shown in FIG. 7C. In one embodiment, interface presenter 242 displays two selectable areas. In response to user selection of data within each area, cloud computing statistics from the intersection of the selected data are displayed by interface presenter 242. For example, as shown in FIG. 7D, in response to user selection of "instances" 714 and "pool" 716, the intersection of the data is displayed 718 by interface presenter 242. In one embodiment, the selectable data includes what type of data is to be displayed 714, such as a dashboard, alerts, quota usage, pools, etc., as well as how they data is to be displayed 716. FIGS. 7E and 7F illustrate additional embodiments of selectable data areas 720 and 730, respectively.

In one embodiment, interface presenter 242 renders cloud computing statistics, as requested from the user selections discussed above, as graphical charts 740 as shown in FIG. 7G. In one embodiment, the graphical charts provide a detailed and dynamic view of a wide range of current statistics for cloud computing systems. In one embodiment, user interface presenter 242 further renders dynamic icons 742 that enable additional visual representations of cloud computing system statistics. In one embodiment, interface presenter 242 renders each dynamic icon as a representational preview of the larger graphical chart, such as chart 740, associated with a dynamic icon represents. In one embodiment, the icons are dynamic because they are rendered with current data to provide a current overview of the associated larger graphic representation. That is, the dynamic icons are not fixed images, but useful samples of current data.

Figure 7H:
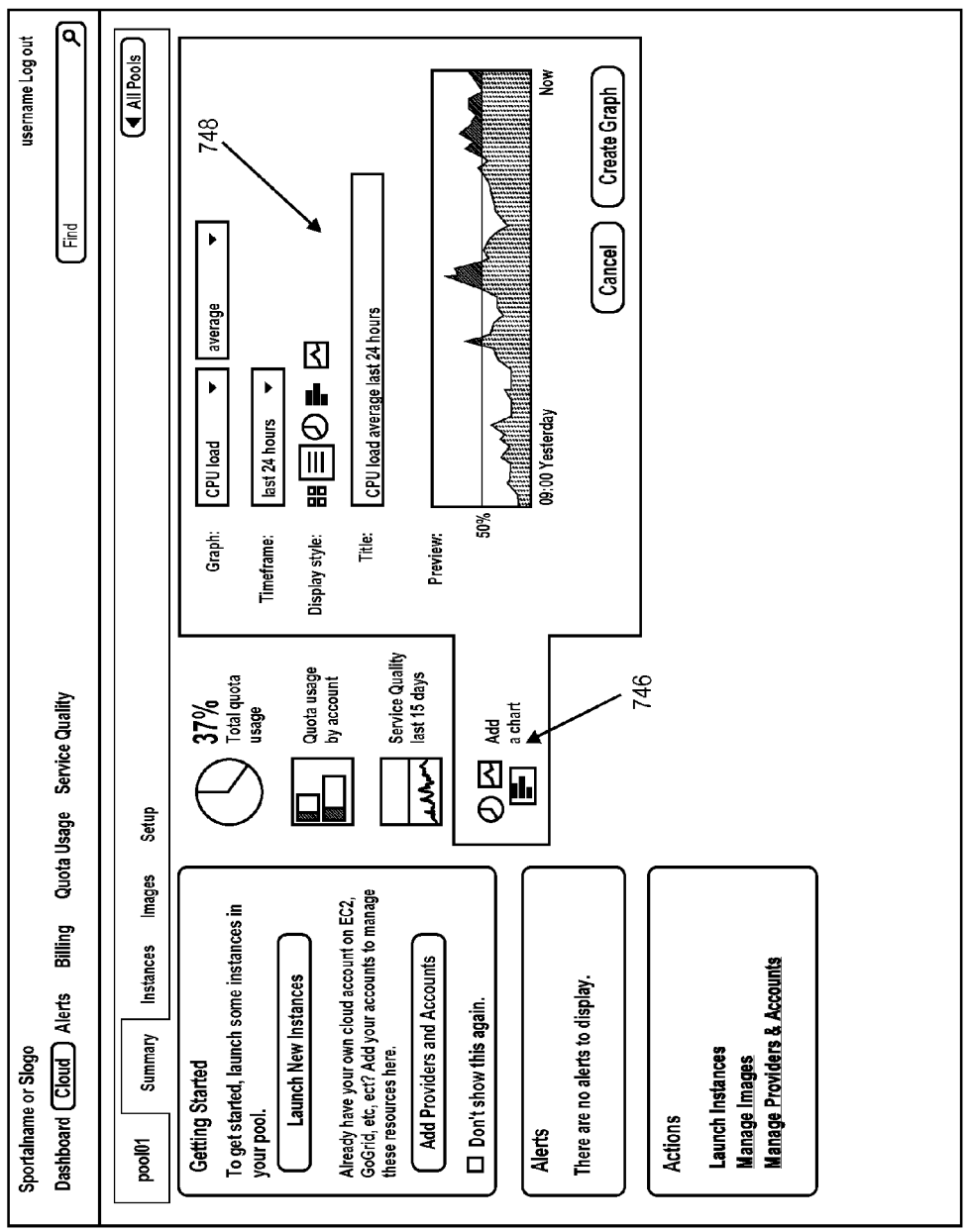
FIG. 7H illustrates one embodiment of a graphical user interface for visualizing and summarizing aggregated cloud computing systems.

In one embodiment, interface presenter 242 may further receive a request to display a new graphical chart 746 of cloud computing system statistics as shown in FIG. 7H. In one embodiment, interface presenter 242 receives a selection 748 of the desired data, the form in which the data is to be displayed, etc. From the user selections 748, interface presenter 242 displays the resulting graphical illustration of the cloud computing system statistics.

Figure 8:
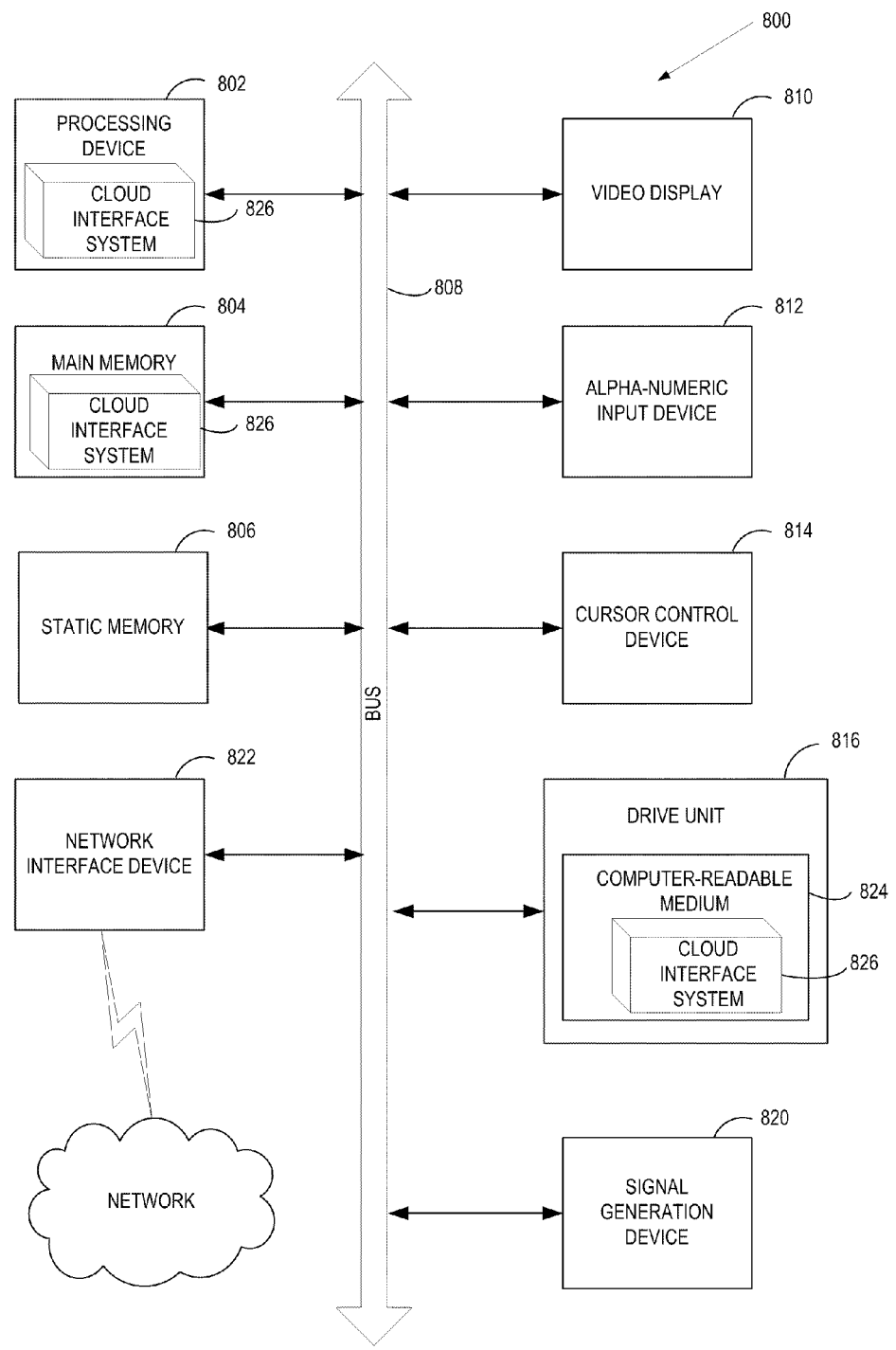
FIG. 8 illustrates a diagrammatic representation of a machine in the exemplary form of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processing device implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 820 may include a computer-readable storage medium 816 on which is stored one or more sets of instructions (e.g., the cloud system aggregation server 826) embodying any one or more of the methodologies or functions described herein. The cloud system aggregation server 826 may also reside, completely or at least partially, within the main memory 804 and/or within the processing device 802 during execution thereof by the computer system 800, the main memory 804 and the processing device 802 also constituting computer-readable storage media. The cloud system aggregation server 826 may further be transmitted or received over a network 620 via the network interface device 808.

While the computer-readable storage medium 816 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receive", "translate", "transmit", "determine", "route", "update", "join", "create", "make", "generate" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method comprising:
   receiving, by a processing device, a specification of a first cloud computing system;
   associating the first cloud computing system with a pool of cloud computing resources;
   identifying a second cloud computing system associated with the pool of cloud computing resources, wherein the identifying is performed in view of a client request and at least one of a parameter of the second client computing system or a parameter of a client which originated the client request;
   translating, by the processing device, the client request from a cloud system-neutral format into a cloud system-specific format associated with the second cloud computing system; and
   forwarding the translated request to the second cloud computing system.

2. The method of claim 1, wherein the associating further comprises:
   updating a database to include the pool of cloud computing resources.

3. The method of claim 1, further comprising:
   receiving a specification of the second cloud computing system.

4. The method of claim 1, wherein the plurality of cloud computing systems includes at least one existing pool of cloud computing system resources.

5. The method of claim 1 further comprising:
   receiving, from a client computer system, a request to access the pool of cloud computing resources;
   generating a link to the pool of cloud computing resources; and
   providing the link to the client computer system.

6. A non-transitory computer readable storage medium comprising executable instructions which, when executed by a processing device, cause the processing device to perform operations comprising:
   receiving a specification of a first cloud computing system;
   associating the first cloud computing system with a pool of cloud computing resources;
   identifying a second cloud computing system associated with the pool of cloud computing resources, wherein the identifying is performed in view of a client request and at least one of a parameter of the second client computing system or a parameter of a client which originated the client request;
   translating, by the processing device, the client request from a cloud system-neutral format into a cloud system-specific format associated with the second cloud computing system; and
   forwarding the translated request to the second cloud computing system.

7. The non-transitory computer readable storage medium of claim 6, wherein the associating further comprises:
   updating a database to include the pool of cloud computing resources.

8. The non-transitory computer readable storage medium of claim 6, further comprising:
   receiving a specification of the second cloud computing system.

9. The non-transitory computer readable storage medium of claim 6, wherein the plurality of cloud computing systems includes at least one existing pool of cloud computing system resources.

10. The non-transitory computer readable storage medium of claim 6, further comprising executable instructions causing the processing device to:
    receive, from a client computer system, a request to access the pool of cloud computing resources;
    generate a link to the pool of cloud computing resources; and
    provide the link to the client computer system.

11. A system comprising:
    a memory; and
    a processing device coupled to the memory, the processing device to:
      receive a specification of a first cloud computing system,
      associate the first cloud computing system with a pool of cloud computing resources,
      identify a second cloud computing system associated with the pool of cloud computing resources, wherein the identifying is performed in view of a client request and at least one of a parameter of the second client computing system or a parameter of a client which originated the client request;
      translate the client request from a cloud system-neutral format into a cloud system-specific format associated with the second cloud computing system; and
      forward the translated request to the second cloud computing system.

12. The system of claim 11, wherein the associating further comprises:
    updating a database to include the pool of cloud computing resources.

13. The system of claim 11, wherein the processing device is further to receive the specification of the second cloud computing system.

14. The system of claim 11, wherein the processing device is further to receive, from a client computer system, a request to access the pool of cloud computing resources, generate a link to the pool of cloud computing resources, and provide the link to the client computer system.

15. The method of claim 1, further comprising:
    responsive to detecting a change in the second cloud computing system, identifying a third cloud computing system associated with the pool of cloud computing resources;
    translating the client request from a cloud system-neutral format into a cloud system-specific format associated with the third cloud computing system; and
    forwarding the translated request to the third cloud computing system.

16. The non-transitory computer readable storage medium of claim 6, further comprising executable instructions causing the processing device to:
    responsive to detecting a change in the second cloud computing system, identifying a third cloud computing system associated with the pool of cloud computing resources;

translating the client request from a cloud system-neutral format into a cloud system-specific format associated with the third cloud computing system; and forwarding the translated request to the third cloud computing system.

17. The system of claim 11, further comprising:

responsive to detecting a change in the second cloud computing system, identifying a third cloud computing system associated with the pool of cloud computing resources;

translating the client request from a cloud system-neutral format into a cloud system-specific format associated with the third cloud computing system; and forwarding the translated request to the third cloud computing system.

* * * * *